United States Patent
Seo

(10) Patent No.: US 9,467,264 B2
(45) Date of Patent: Oct. 11, 2016

(54) METHOD FOR ALLOCATING REFERENCE SIGNAL ANTENNA PORT FOR TRANSMISSION DIVERSITY TECHNIQUE IN WIRELESS COMMUNICATION SYSTEM, AND APPARATUS FOR SAME

(71) Applicant: LG ELECTRONICS INC., Seoul (KR)

(72) Inventor: Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 155 days.

(21) Appl. No.: 14/376,118

(22) PCT Filed: Feb. 7, 2013

(86) PCT No.: PCT/KR2013/000991
§ 371 (c)(1),
(2) Date: Jul. 31, 2014

(87) PCT Pub. No.: WO2013/119053
PCT Pub. Date: Aug. 15, 2013

(65) Prior Publication Data
US 2015/0003365 A1 Jan. 1, 2015

Related U.S. Application Data

(60) Provisional application No. 61/596,742, filed on Feb. 9, 2012.

(30) Foreign Application Priority Data

Feb. 6, 2013 (KR) ........................ 10-2013-0013327

(51) Int. Cl.
*H04L 5/00* (2006.01)
*H04L 5/14* (2006.01)

(52) U.S. Cl.
CPC ........... *H04L 5/0051* (2013.01); *H04L 5/0053* (2013.01); *H04L 5/0023* (2013.01); *H04L 5/1469* (2013.01)

(58) Field of Classification Search
None
See application file for complete search history.

(56) References Cited

U.S. PATENT DOCUMENTS

| 8,289,917 B1* | 10/2012 | Koivisto | H04L 5/0048 370/252 |
| 2010/0061360 A1* | 3/2010 | Chen | H04L 5/0023 370/342 |
| 2011/0235730 A1* | 9/2011 | Noh | H04B 7/0617 375/260 |

(Continued)

FOREIGN PATENT DOCUMENTS

| KR | 10-2010-0032346 | 3/2010 |
| KR | 10-2011-0001936 | 1/2011 |
| KR | 10-2011-0007977 | 1/2011 |
| KR | 10-2011-0093564 | 8/2011 |

OTHER PUBLICATIONS

ZTE, "Consideration on Downlink Signalling for DMRS port indication with different MU dimensions," TSG-RAN WG1 #60bis, R1-101834, Apr. 2010, 5 pages.

(Continued)

*Primary Examiner* — Derrick Ferris
*Assistant Examiner* — Jay Vogel
(74) *Attorney, Agent, or Firm* — Lee, Hong, Degerman, Kang & Walmey; Jonathan Kang; Michael Monaco

(57) ABSTRACT

In the present invention, disclosed is a method for a base station transmitting a downlink control channel to a user equipment in a wireless communication system. More particularly, the method comprises the steps of: establishing resource element subsets comprising a plurality of resource elements; allocating a transmission resource for the downlink control channel in units of the resource element subsets; alternately allocating to the plurality of resource elements two antenna ports for demodulation-reference signal (DM-RS); and transmitting the downlink control channel to the user equipment through the transmission resource that is allocated by using the DM-RSs of the antenna ports that are allocated.

6 Claims, 15 Drawing Sheets

| RE index in a EREG | RE #0 | RE #1 | RE #2 | RE #3 | RE #4 | RE #5 | RE #6 | RE #7 | RE #8 |
|---|---|---|---|---|---|---|---|---|---|
| | 7 | 9 | 7 | 9 | 7 | 9 | 7 | 9 | 7 |

(a) normal CP

| RE index in a EREG | RE #0 | RE #1 | RE #2 | RE #3 | RE #4 | RE #5 | RE #6 | RE #7 | RE #8 |
|---|---|---|---|---|---|---|---|---|---|
| | 7 | 8 | 7 | 8 | 7 | 8 | 7 | 8 | 7 |

(b) extended CP

(56) References Cited

U.S. PATENT DOCUMENTS

2012/0195271 A1* 8/2012 Lee .................. H04L 5/003
                                                      370/329
2014/0348126 A1* 11/2014 Seo ................. H04L 5/0005
                                                      370/330

OTHER PUBLICATIONS

PCT International Application No. PCT/KR2013/000991, Written Opinion of the International Searching Authority dated May 15, 2013, 1 page.

* cited by examiner (a) contol - plane protocol stack (b) user - plane protocol stack (a) 1TX or 2TX (b) 4 TX

| RE index in a EREG | RE #0 | RE #1 | RE #2 | RE #3 | RE #4 | RE #5 | RE #6 | RE #7 | RE #8 |
|---|---|---|---|---|---|---|---|---|---|
| | 7 | 9 | 7 | 9 | 7 | 9 | 7 | 9 | 7 |

(a) normal CP

| RE index in a EREG | RE #0 | RE #1 | RE #2 | RE #3 | RE #4 | RE #5 | RE #6 | RE #7 | RE #8 |
|---|---|---|---|---|---|---|---|---|---|
| | 7 | 8 | 7 | 8 | 7 | 8 | 7 | 8 | 7 |

(b) extended CP

METHOD FOR ALLOCATING REFERENCE SIGNAL ANTENNA PORT FOR TRANSMISSION DIVERSITY TECHNIQUE IN WIRELESS COMMUNICATION SYSTEM, AND APPARATUS FOR SAME

CROSS-REFERENCE TO RELATED APPLICATIONS

This application is the National Stage filing under 35 U.S.C. 371 of International Application No. PCT/KR2013/000991, filed on Feb. 7, 2013, which claims the benefit of earlier filing date and right of priority to Korean Application No. 10-2013-0013327, filed on Feb. 6, 2013 and also the claims the benefit of U.S. Provisional Application Ser. No. 61/596,742, filed on Feb. 9, 2012, the contents of which are all hereby incorporated by reference herein in their entirety.

TECHNICAL FIELD

The present invention relates to a wireless communication system, and more particularly, to a method of allocating a reference signal antenna port for a transmit diversity technique in a wireless communication system and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of allocating a reference signal antenna port for a transmit diversity technique in a wireless communication system and an apparatus therefor in the following description based on the discussion mentioned earlier in the foregoing description.

Technical Solution

To achieve these and other advantages and in accordance with the purpose of the present invention, as embodied and broadly described, according to one embodiment, a method of transmitting a downlink control channel, which is transmitted to a user equipment by an eNode B in a wireless communication system, includes the steps of setting resource element subsets consisting of a plurality of resource elements, allocating a transmission resource for the downlink control channel in the resource element subset unit, allocating two antenna ports for DM-RSs (demodulation-reference signals) to a plurality of the resource elements in turn and transmitting the downlink control channel to the user equipment via the allocated transmission resource using DM-RSs of the allocated antenna ports.

To further achieve these and other advantages and in accordance with the purpose of the present invention, according to a different embodiment, an eNode B device in a wireless communication system includes a processor configured to set resource element subsets consisting of a plurality of resource elements, the processor configured to allocate a transmission resource for the downlink control channel in the resource element subset unit, the processor configured to allocate two antenna ports for DM-RSs (demodulation-reference signals) to a plurality of the resource elements in turn and a wireless communication module configured to transmit the downlink control channel to a user equipment via the allocated transmission resource using DM-RSs of the allocated antenna ports.

According to embodiments of the present invention, indexes of the antenna ports of the two DM-RSs are determined based on the number of available resource elements of a subframe in which the downlink control channel is transmitted or a length of a cyclic prefix.

Preferably, if the downlink control channel is transmitted in a subframe to which a normal cyclic prefix is applied, the antenna ports of the two DM-RSs correspond to antenna ports of DM-RSs which are not multiplexed to an identical resource element. And, if the downlink control channel is transmitted in a subframe to which an extended cyclic prefix is applied, the antenna ports of the two DM-RSs correspond to antenna ports of DM-RSs which are multiplexed to an identical resource element.

More preferably, if the downlink control channel is transmitted in a subframe to which a normal cyclic prefix is applied, indexes of the antenna ports of the two DM-RSs correspond to 7 and 9. And, if the downlink control channel is transmitted in a subframe to which an extended cyclic prefix is applied, indexes of the antenna ports of the two DM-RSs correspond to 7 and 8.

Advantageous Effects

According to embodiment of the present invention, a reference signal for a downlink control channel, in particular, an antenna port of a DM-RS can be efficiently allocated to apply a transmit diversity technique.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 1:
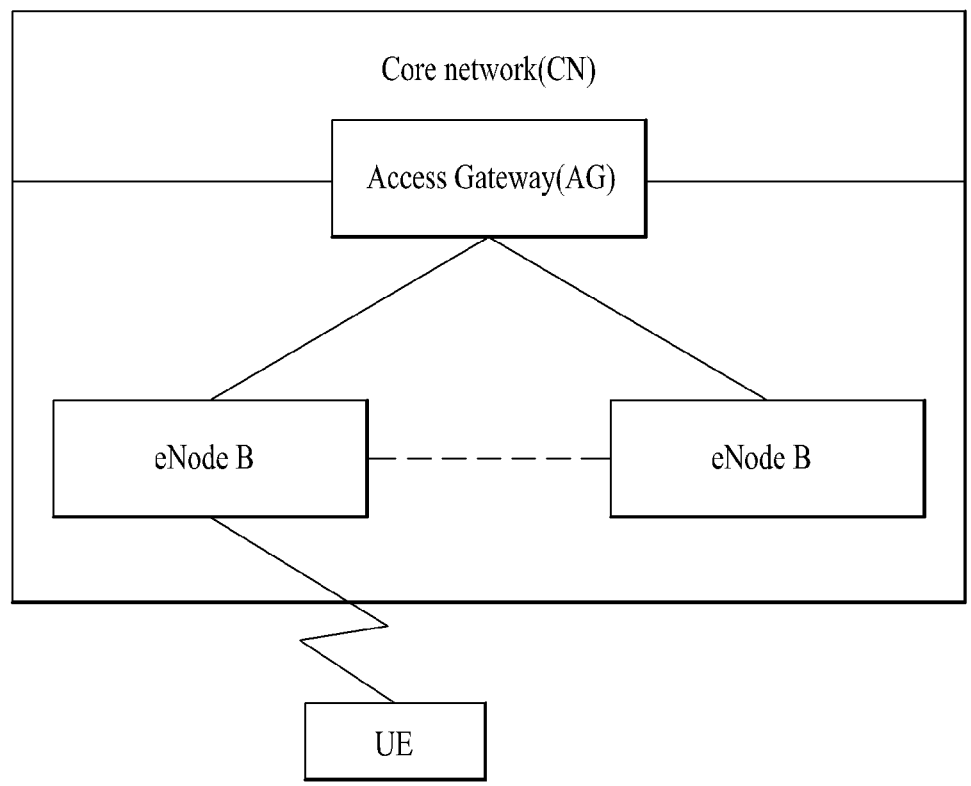
FIG. 1 is a schematic diagram of E-UMTS network structure as one example of a wireless communication system.
Figure 2:
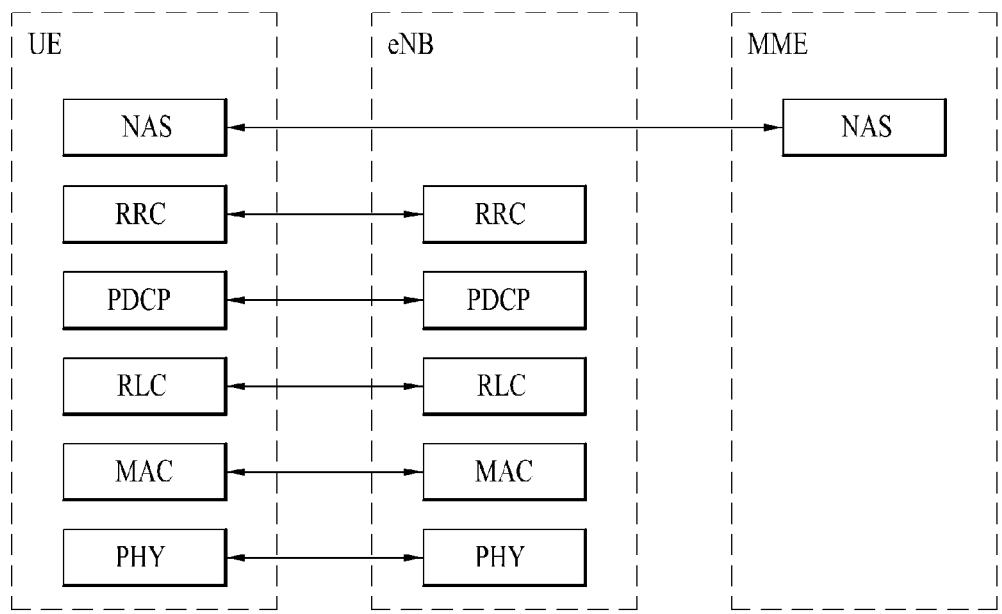
FIG. 2 is a diagram for structures of control and user planes of radio interface protocol between a 3GPP radio access network standard-based user equipment and E-UTRAN.
Figure 2:
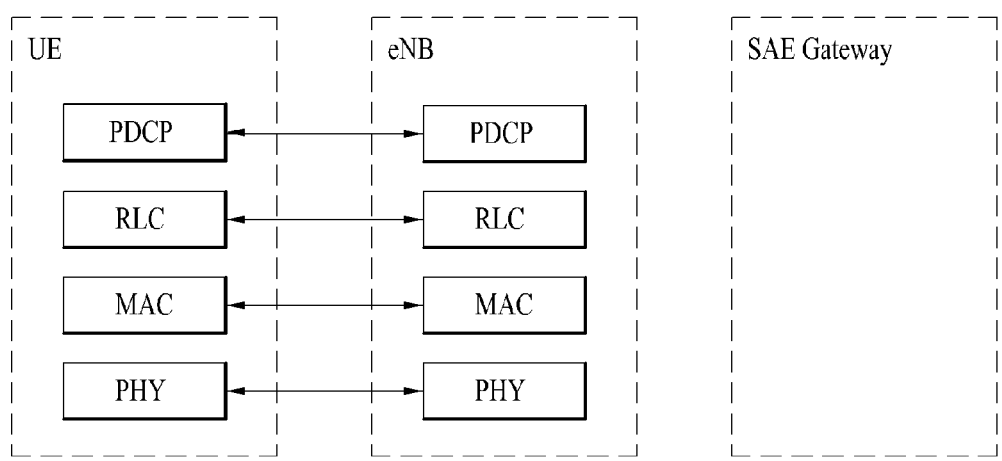

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
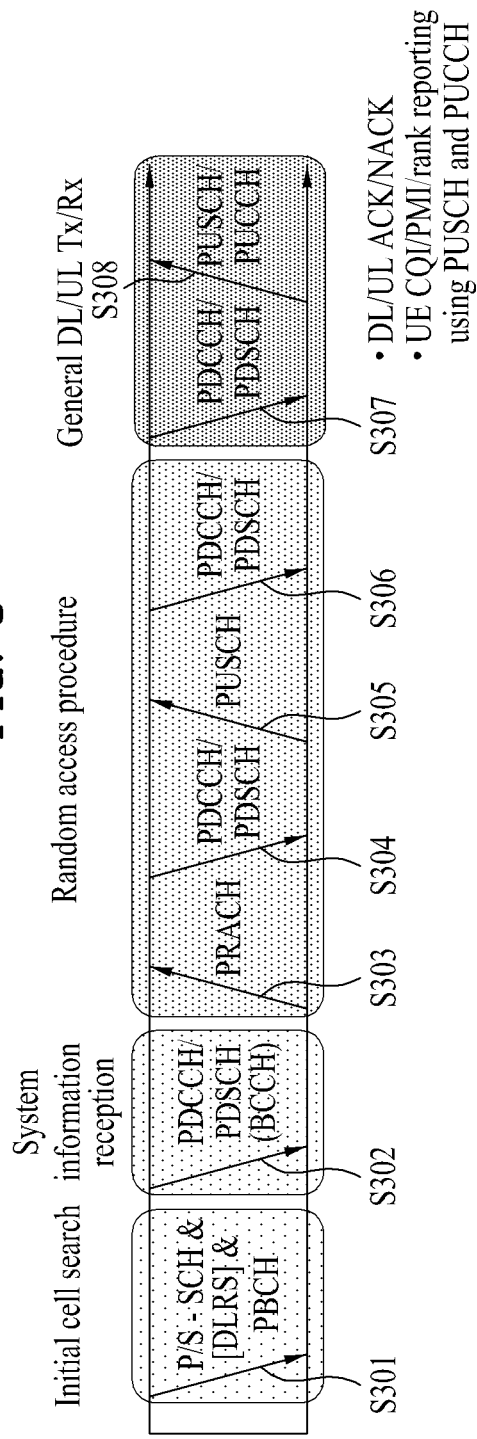
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi-antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 4:
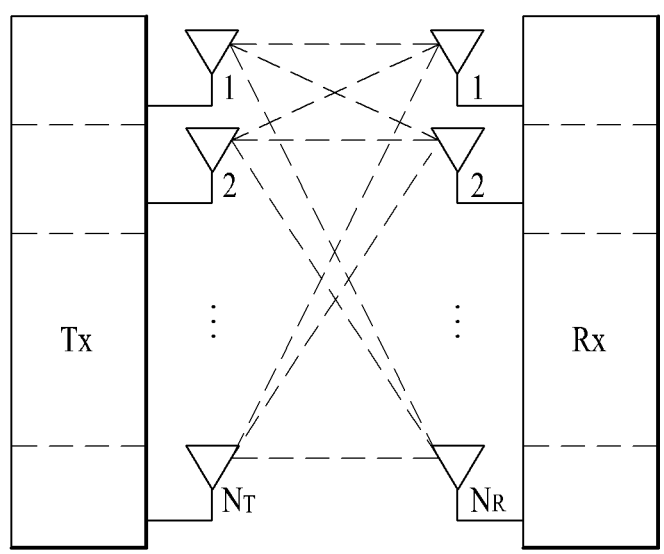
FIG. 4 is a diagram for a configuration of a multiple antenna communication system.

A block diagram of a general multi-antenna communication system is depicted in FIG. 4. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value among the $N_T$ and the $N_R$.

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna so far, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

Figure 7:
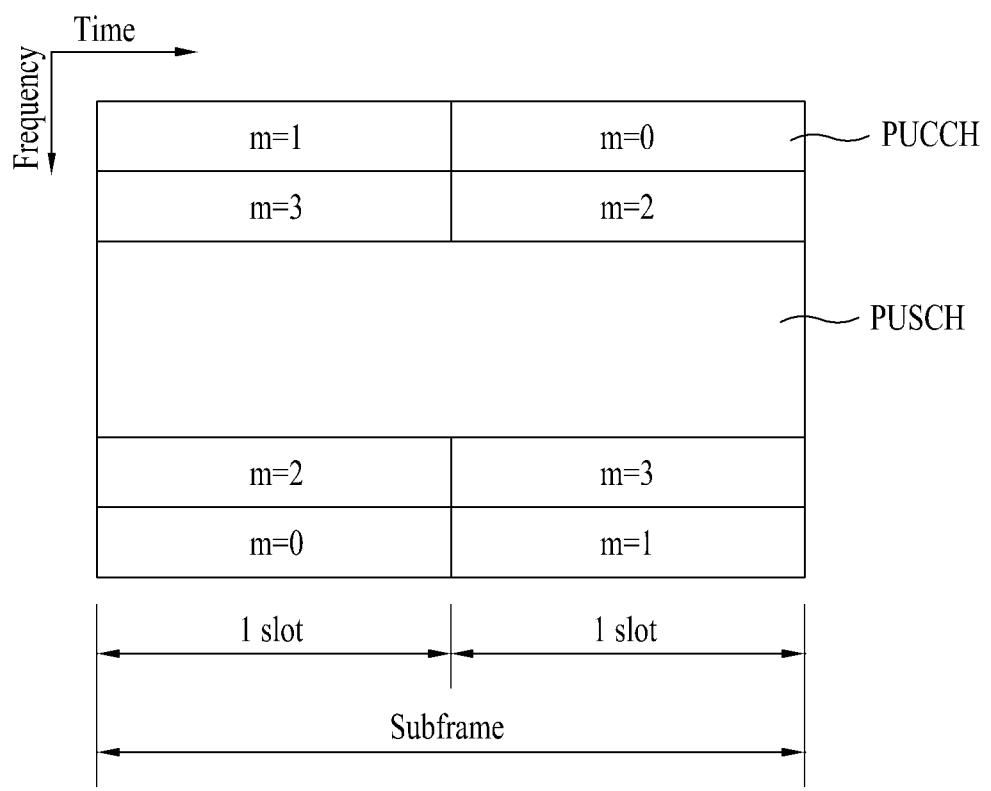
FIG. 7 is a diagram for a structure of an uplink radio frame in LTE system.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s=[s_1, s_2, \ldots, s_{N_T}]^T \quad \text{[Formula 2]}$$

Meanwhile, for each of the transmission informations $s_1$, $s_2$, ..., $s_{N_T}$, a transmit power may be differentiated according to the each of the transmission informations. In this case, if each of the transmit powers is represented as $P_1$, $P_2$, ..., $P_{N_T}$, transmit power-adjusted transmission information can be represented as a vector in the following Formula 3.

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector $\hat{s}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The W is called the weighted matrix or a precoding matrix.

$$x = \begin{bmatrix} x_1 \\ x_2 \\ \vdots \\ x_i \\ \vdots \\ x_{N_T} \end{bmatrix} \quad \text{[Formula 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \quad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \quad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Of course, a hybrid form of the space diversity and the space multiplexing is also available.

Figure 5:
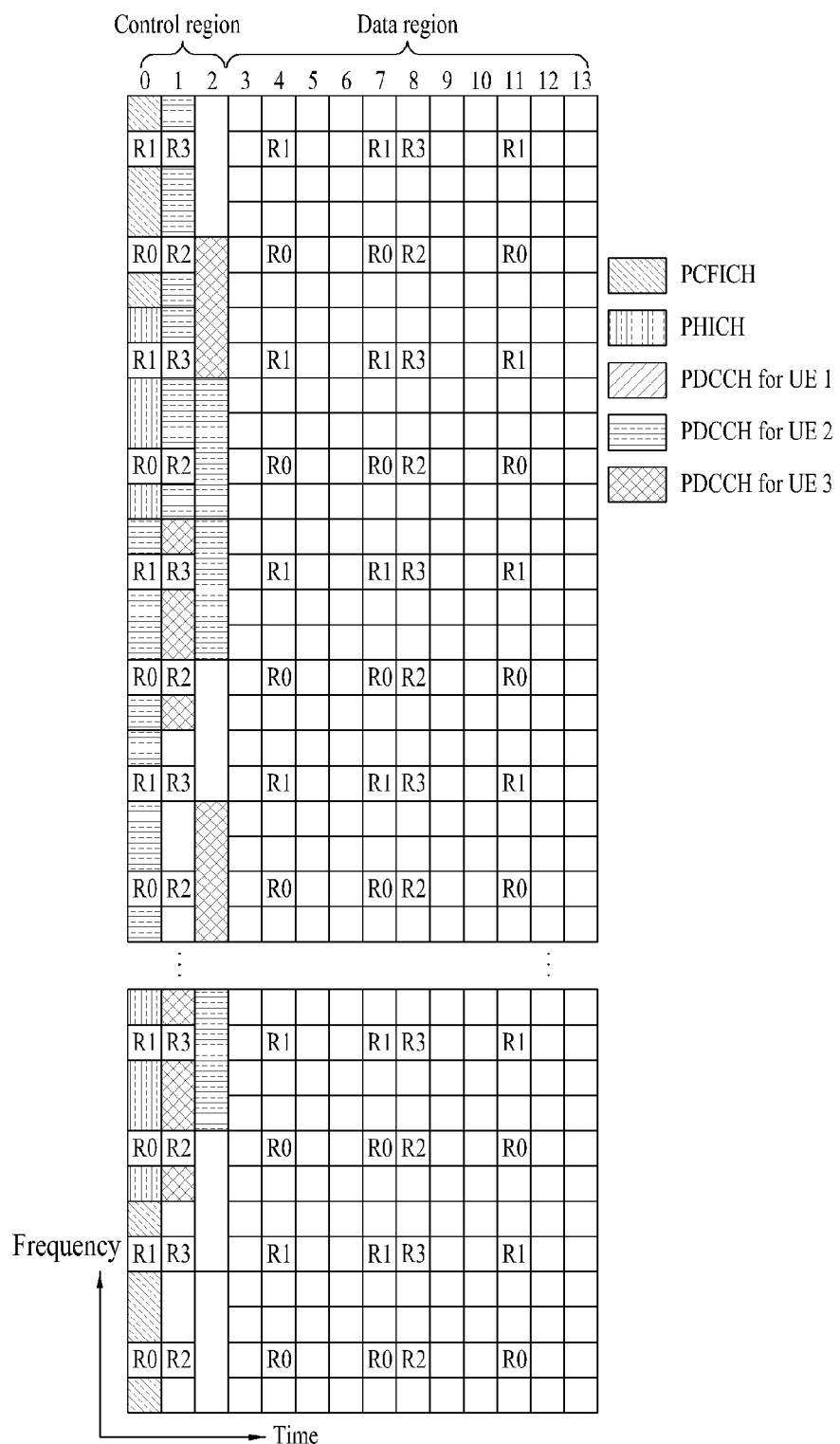
FIG. 5 is a diagram for a structure of a downlink radio frame in LTE system.

FIG. 5 is a diagram for showing an example of a control channel included in a control region of a single subframe in a DL radio frame. The number of OFDM symbols included in a single subframe varies according to a space between a length of a cyclic prefix (CP) (i.e., a normal CP or an extended CP) and a subcarrier. In the following description, assume that a space between a normal CP and a subcarrier corresponds to 15 kHz.

Referring to FIG. 5, a subframe consists of 14 OFDM symbols. According to a subframe configuration, the first 1 to 3 OFDM symbols are used for a control region and the other 13~11 OFDM symbols are used for a data region.

In FIG. 5, R1 to R4 may indicate a reference signal (RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
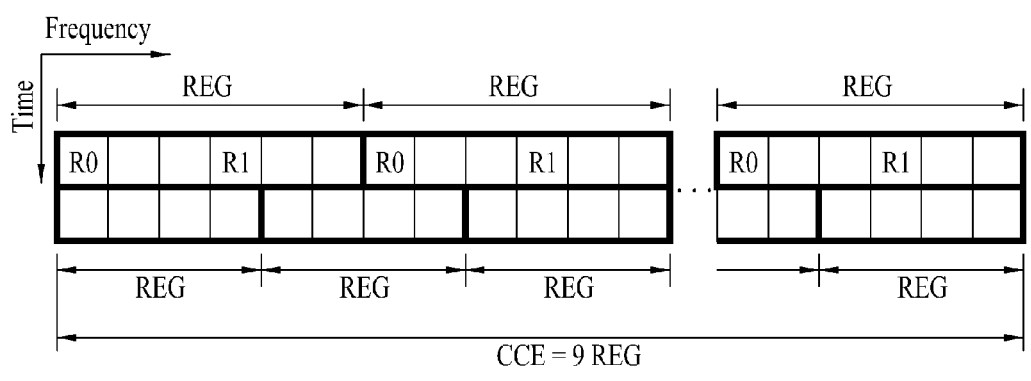
FIG. 6 is a diagram of a resource unit used for constructing a control channel.
Figure 6:
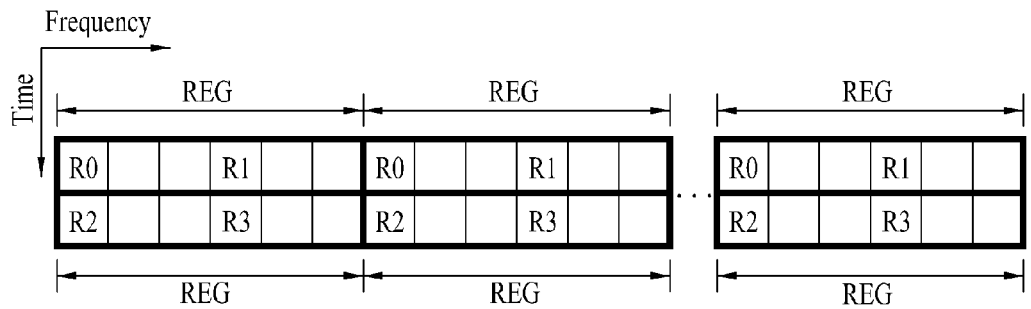

FIG. 6 is a diagram of a resource unit used for constructing a downlink control channel in LTE system. In particular, FIG. 6(a) indicates a case that the number of transmitting antennas of an eNode B corresponds to 1 or 2 and FIG. 6(b) indicates a case that the number of transmitting antennas of the eNode B corresponds to 4. A reference signal (RS) pattern varies according to the number of transmitting antennas but a method of configuring a resource unit in relation to a control channel is identical irrespective of the number of transmitting antennas.

Referring to FIG. 6, a base resource unit of a downlink control channel is a REG (resource element group). The REG consists of 4 neighboring resource elements except an RS. The REG is represented in the drawing with a bold line. The PCFICH and the PHICH include 4 REGs and 3 REGs, respectively. The PDCCH consists of a CCE (control channel element) unit and one CCE includes 9 REGs.

In order for a UE to check whether the PDCCH consisting of L number of CCEs is transmitted to the UE, the UE is configured to check the CCEs contiguously arranged by $M^{(L)}$ ($\geq L$) number of CCEs or a specific rule. A value of the L, which should be considered for the UE to receive the PDCCH, may become a plural number. The UE should check CCE aggregations to receive the PDCCH. The CCE aggregations are called a search space. As an example, the search space is defined by LTE system as Table 1 in the following.

TABLE 1

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, 2B, 1D, 2, 2A, 2B, 4 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In this case, CCE aggregation level L indicates the number of CCE consisting of PDCCH, $S_k^{(L)}$ indicates a search space of the CCE aggregation level L and $M^{(L)}$ indicates the number of candidate PDCCHs monitored in the search space of the aggregation level L.

The search space can be classified into a UE-specific search space accessible by a specific UE only and a common search space accessible by all UEs in a cell. A UE monitors the common search space of which the CCE aggregation level corresponds to 4 and 8 and monitors the UE-specific search space of which the CCE aggregation level corresponds to 1, 2, 4, and 8. The common search space and the UE-specific search space may overlap with each other.

And, a position of a first (having a smallest index) CCE in a PDCCH search space, which is given to a random UE for each CCE aggregation level value, varies in every subframe depending on a user equipment. This is called a PDCCH search space hashing.

The CCE can be distributed to a system band. More specifically, a plurality of CCEs, which are logically contiguous, can be inputted to an interleaver. The interleaver performs a function of mixing a plurality of the CCEs with each other in REG unit. Hence, frequency/time resources forming a CCE are physically distributed in the total frequency/time domain within a control region of a subframe. Consequently, although a control channel is constructed in a CCE unit, the interleaving is performed in an REG unit. Hence, frequency diversity and interference randomization gain can be maximized.

FIG. 7 is a diagram for a structure of an uplink subframe used in LTE system.

Referring to FIG. 7, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 7 shows an example that the PUCCHs satisfying conditions (e.g., m=0, 1, 2, 3) are assigned to a subframe.

Meanwhile, as various devices requiring M2M (machine-to-machine) communication and high data transmission capacity are emerged and disseminated, data requisites for a cellular network are rapidly increasing in a current wireless communication environment. In order to satisfy high data requisite, communication technologies are developing to a carrier aggregation technology for efficiently using more frequency bands, a multi-antenna technology used for increasing data capacity in a limited frequency, a multi-base station cooperation technology, and the like and the communication environment is evolving in a manner that density of an accessible node is growing in the vicinity of a user. A system equipped with the node of high density may have higher system performance by means of cooperation between nodes. Compared to a node operating as an independent base station (a base station (BS), an advanced BS (ABS), a Node-B (NB), an eNode-B (eNB), an access point (AP), and the like) without cooperation, the aforementioned scheme may have superior performance.

Figure 8:
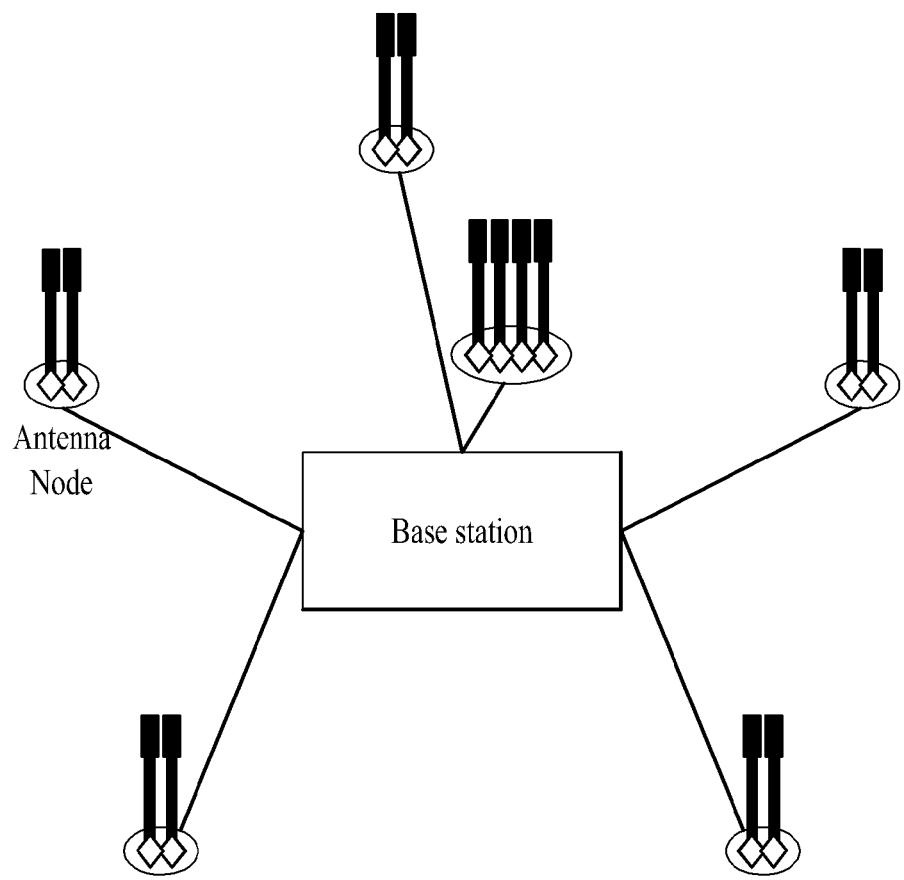
FIG. 8 is a diagram for an example of a multi node system in a next generation communication system.

FIG. 8 is a diagram for an example of a multi node system in a next generation communication system.

Referring to FIG. 8, if an individual node operates as a part of antenna group of a cell in a manner that a controller manages transmission and reception of all nodes, it may correspond to a distributed multi node system (DMNS) that forms a single cell. In this case, each of the individual nodes may receive a separate node ID or may operate as a part of antenna within the cell without a separate Node ID. Yet, if nodes have a cell identifier (ID) different from each other, it may correspond to a multi-cell system. If a multi cell is configured by a duplicated form according to coverage, this is called a multi-tier network.

Meanwhile, a Node-B, an eNode-B, a PeNB, a HeNB, an RRH (remote radio head), a relay, a distributed antenna, and the like may become a node and at least one antenna is installed in a node. A node is also called a transmission point. In general, a node indicates an antenna group apart from each other more than a prescribed space, the present invention defines and applies a node as a random antenna group irrespective of a space.

With the help of the introduction of the aforementioned multi-node system and a relay node, application of various communication schemes is enabled and channel quality enhancement can be performed. Yet, in order to apply the aforementioned MIMO scheme and inter-cell cooperation communication scheme to a multi-node environment, an introduction of a new control channel is required. To this end, a control channel considered as the newly introduced control channel, which corresponds to an E-PDCCH (enhanced-PDCCH), is under discussion. This channel is determined to be assigned to a data region (hereinafter described as PDSCH region) instead of a legacy control region (hereinafter described as PDCCH region). Consequently, control information on a node can be transmitted according to each UE via the E-PDCCH. Hence, a problem of shortage of the legacy PDCCH region can be solved as well. For reference, the E-PDCCH is not provided to a legacy UE. Instead, an LTE-A UE can receive the E-PDCCH only. And, transmission/reception of the E-PDCCH is performed based on a DM-RS (or CSI-RS) instead of a CRS corresponding to a legacy cell-specific reference signal.

Figure 9:
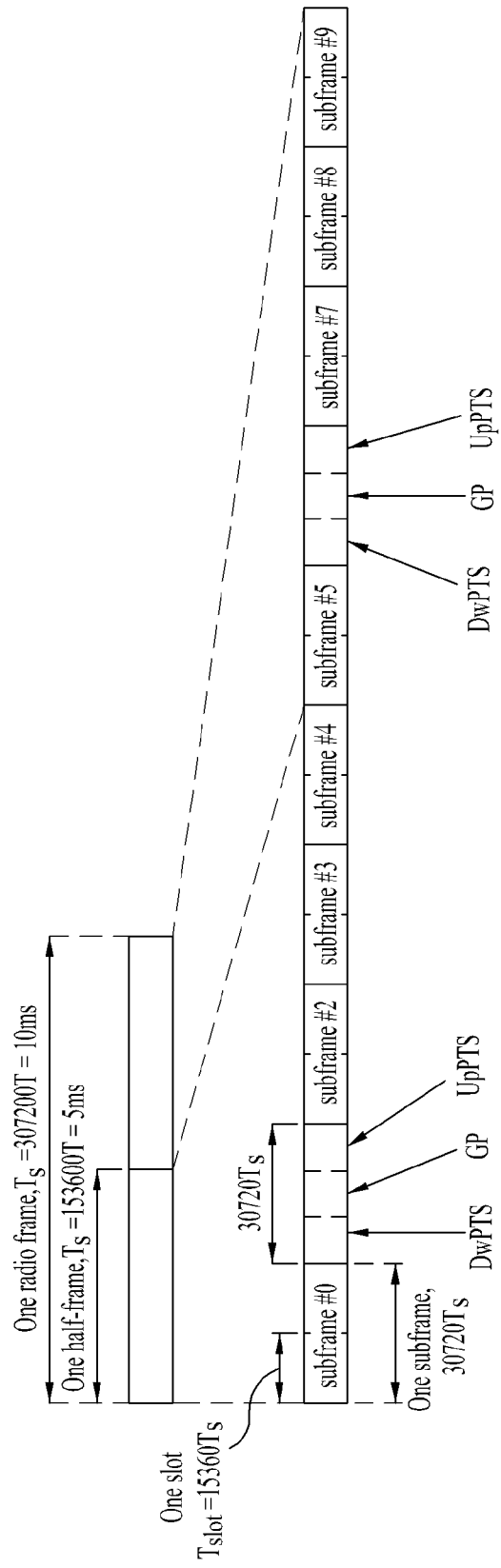
FIG. 9 is a diagram for an example of a structure of a radio frame in LTE TDD system.

FIG. 9 is a diagram for an example of a structure of a radio frame in LTE TDD system. In LTE TDD system, a radio frame includes two half frames. Each of the half frames includes 4 normal subframes including 2 slots, respectively and a special subframe including DwPTS (downlink pilot time slot), GP (guard period) and UpPTS (uplink pilot time slot).

Among the special subframe, the DwPTS is used for initial cell search in a user equipment, synchronization or channel estimation. The UpPTS is used for channel estimation in a base station and uplink transmission synchronization of the user equipment. In particular, the DwPTS is used for DL transmission and the UpPTS is used for UL transmission. In particular, the UpPTS is utilized to transmit a PRACH preamble or an SRS. The guard period is a period for eliminating interference generated in uplink due to multi-path delay of a downlink signal between uplink and downlink.

Regarding the special subframe, configuration of the special subframe is defined by a current 3GPP standard document as Table 2 in the following. Referring to Table 2, in case of $T_s=1/(15000 \times 2048)$, it indicates the DwPTS and the UpPTS and a remaining region is configured as the guard period.

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |

TABLE 2-continued

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 10:
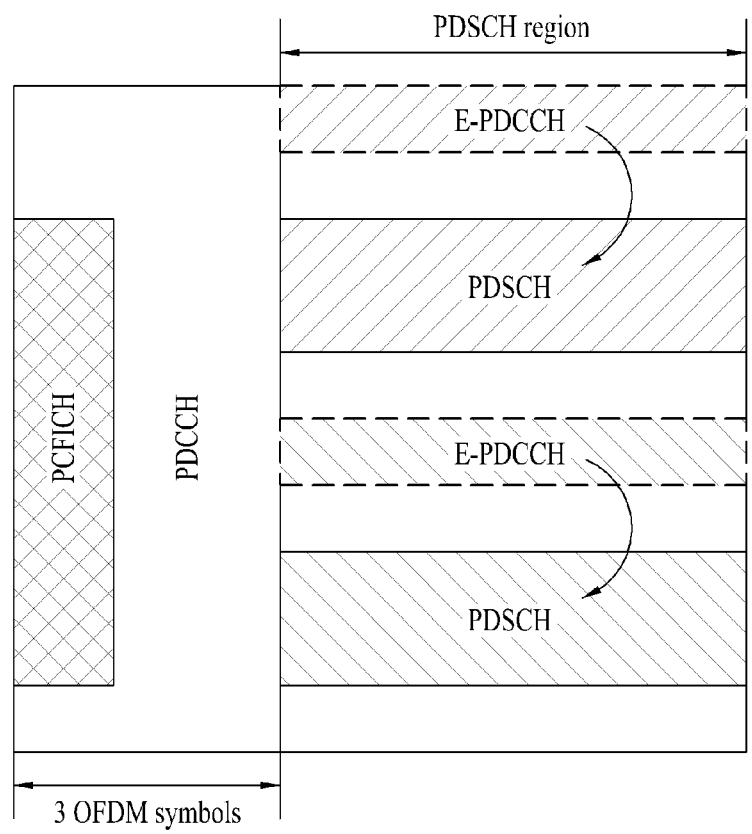
FIG. 10 is a diagram for an example of E-PDCCH and PDSCH scheduled by the E-PDCCH.

FIG. 10 is a diagram for an example of E-PDCCH and PDSCH scheduled by E-PDCCH.

Referring to FIG. 10, E-PDCCH can be transmitted via a PDSCH region, which transmits data in general. A UE should perform a blind decoding on a search space for E-PDCCH to detect presence or non-presence of the E-PDCCH in the UE.

The E-PDCCH performs a scheduling operation (i.e., PDSCH, PUSCH control) identical to that of a legacy PDCCH. Yet, if the number of such a UE accessed a node as an RRH increases, more E-PDCCHs are assigned to the PDSCH region. Hence, the number of blind decoding, which should be performed by the UE, increases and complexity may increase as well.

In general, since a single PRB-pair includes a great amount of resource elements for a control channel signal transmission, it is preferable to transmit E-PDCCH in a manner of dividing available resource elements included in the single PRB-pair into one or more resource element subsets and properly utilizing the resource element subsets.

Meanwhile, the resource element subset can be called an E-CCE which becomes a unit of transmitting the E-PDCCH. One E-PDCCH can be transmitted in a manner of combining one or a plurality of E-CCEs with each other according to an aggregation level.

Or, the resource element subset can also be called an E-REG, which is a further different unit configuring the E-CCE. In this case, the E-CCE can be defined as a set of E-REGs situating at a plurality of PRB-pairs. Similarly, one E-PDCCH can be transmitted in a manner of combining one or a plurality of E-CCEs with each other according to an aggregation level.

In the following, a reference signal is explained in more detail.

In general, a reference signal, which is already known to both a transmitting end and a receiving end, is transmitted from the transmitting end to the receiving end together with data to measure a channel. The reference signal plays not only a role of measuring a channel but also a role of making a demodulation process to be performed in a manner of informing the receiving end of a modulation scheme. The reference signal is classified into a dedicated reference signal (DRS) used for an eNB and a specific user equipment (i.e., UE-specific reference signal) and a cell-specific reference signal used for all UEs in a cell (i.e., common reference signal or cell specific RS (CRS)). The cell-specific reference signal includes a reference signal used for reporting CQI/PMI/RI to an eNB in a manner of measuring CQI/PMI/RI in a user equipment. This sort of reference signal is called a CSI-RS (channel state information-RS).

Figure 11:
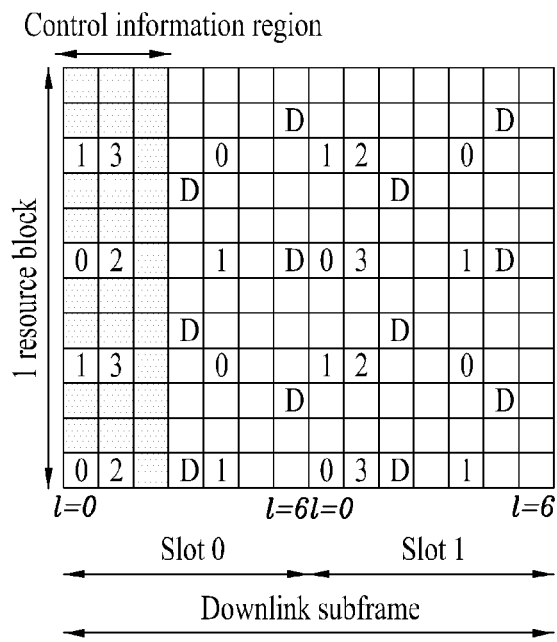
FIG. 11 and FIG. 12 are diagrams of a structure of a reference signal in LTE system supportive of downlink transmission using 4 antennas.
Figure 12:
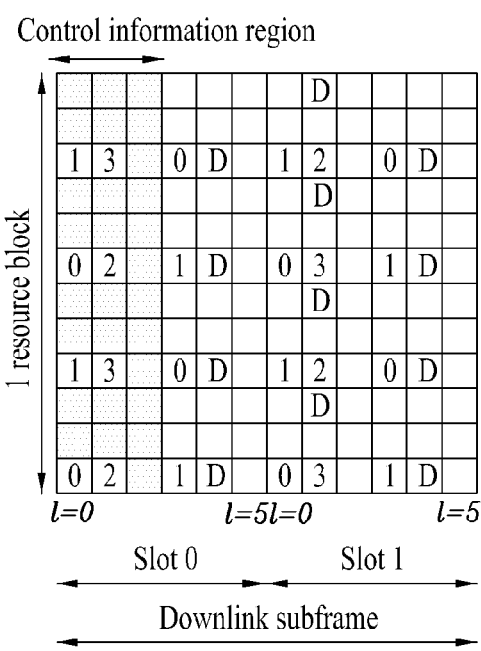

FIG. 11 and FIG. 12 are diagrams of a structure of a reference signal in LTE system supportive of downlink transmission using 4 antennas. In particular, FIG. 11 shows a case of a normal cyclic prefix and FIG. 12 shows a case of an extended cyclic prefix.

Referring to FIG. 11 and FIGS. 12, 0 to 3 written on a grid may mean the CRS (common reference signal), which is a cell-specific reference signal, transmitted for the channel measurement and the data demodulation in a manner of corresponding to antenna port 0 to 3, respectively. The cell-specific reference signal CRS can be transmitted to a user equipment via the control information region as well as the data information region.

And, 'D' written on the grid may mean a downlink DM-RS (demodulation RS), which is a user-specific RS. The DM-RS supports a single antenna port transmission via the data region, i.e., the PDSCH. The user equipment is signaled whether the DM-RS, which is the user equipment-specific RS, exists or not via an upper layer. FIG. 11 and FIG. 12 show an example of the DM-RS corresponding to an antenna port 5. The DM-RSs corresponding to an antenna port 7 to 14, i.e., total 8 antenna ports, are also defined by 3GPP standard document 36.211.

Figure 13:
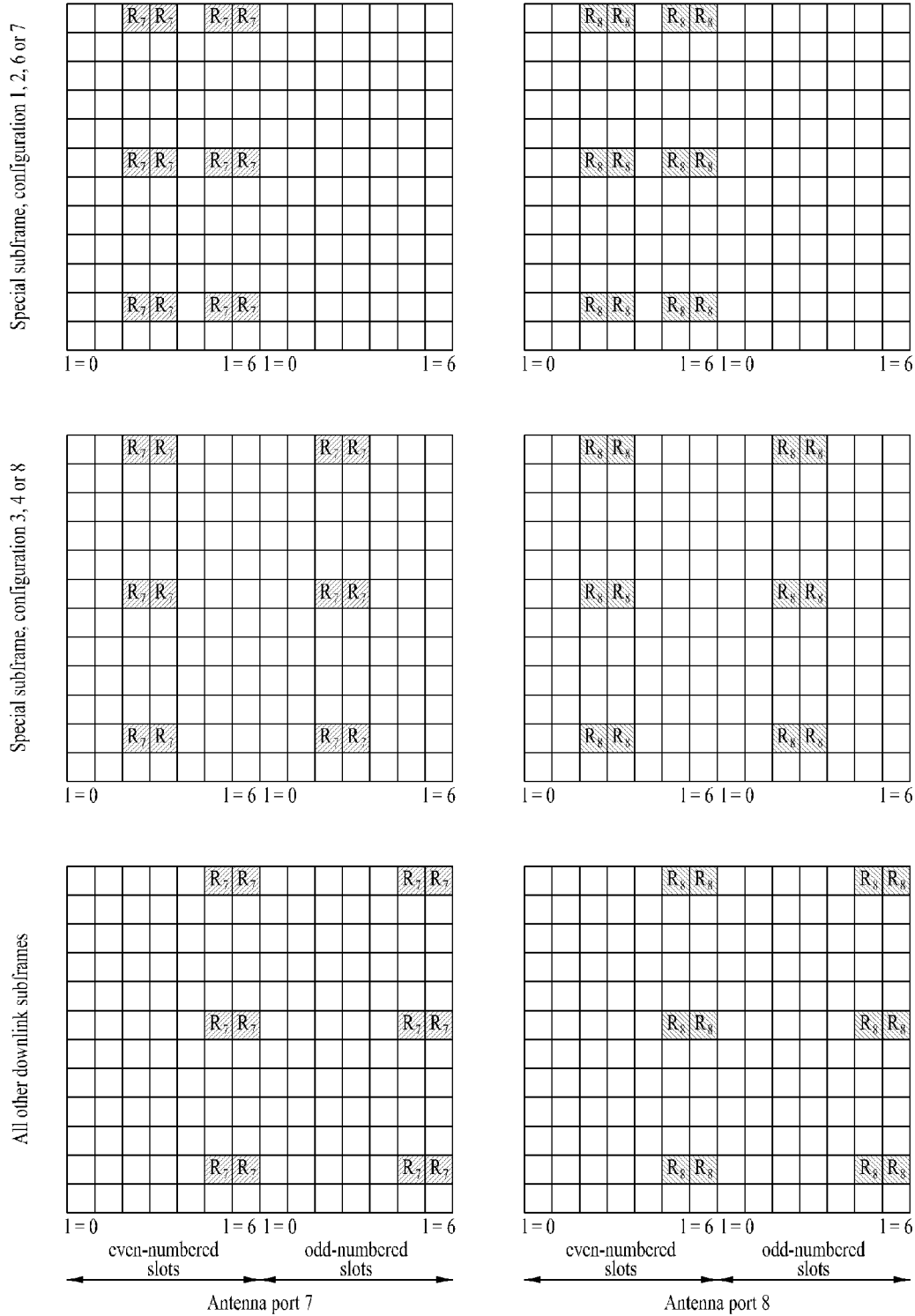
FIG. 13 and FIG. 14 are diagrams for an example of DM-RS allocation in a subframe to which a normal CP, which is defined by current 3GPP standard documentation, is applied.
Figure 14:
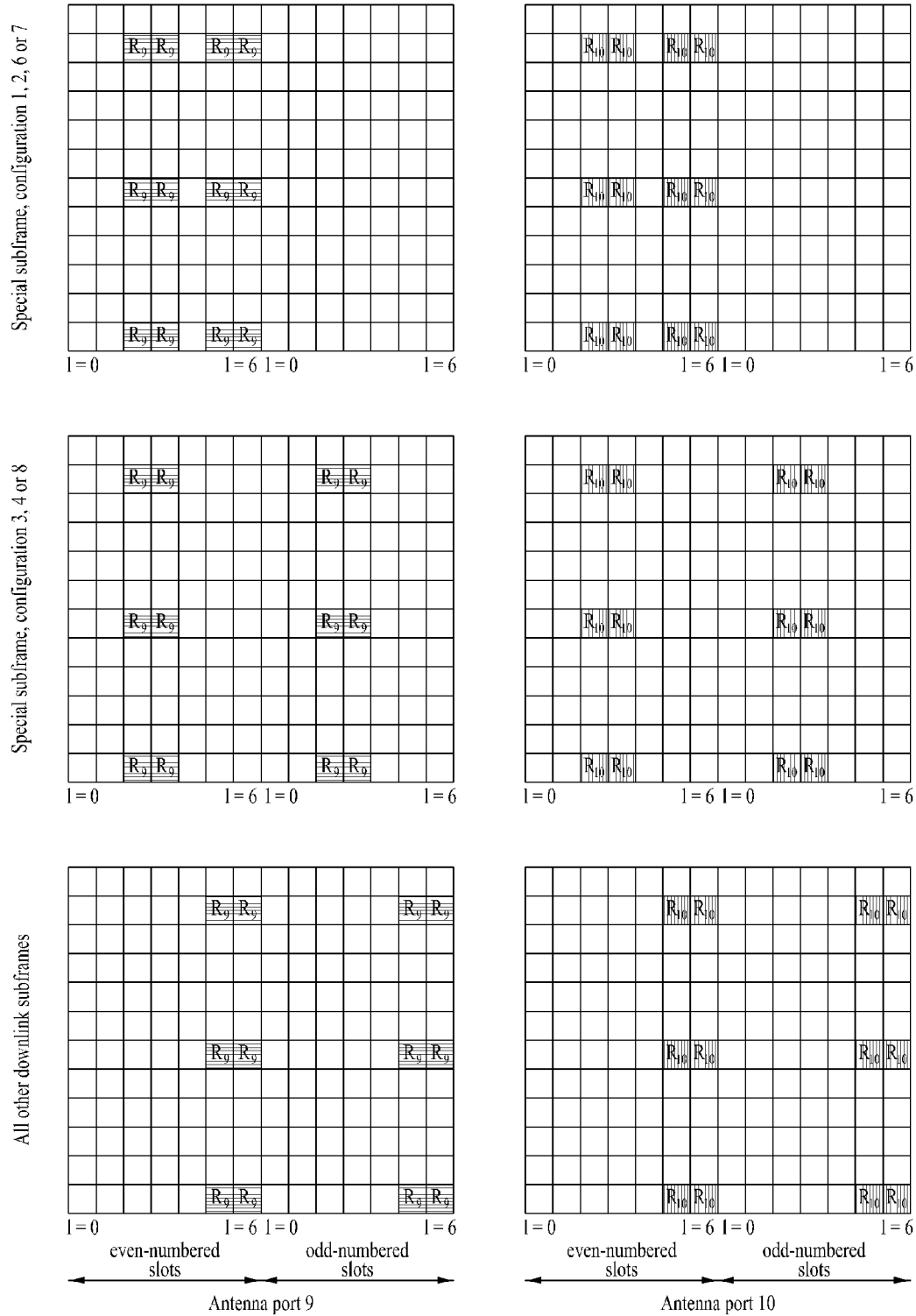

FIG. 13 and FIG. 14 are diagrams for an example of DM-RS allocation in a subframe to which a normal CP, which is defined by current 3GPP standard documentation, is applied. In particular, FIG. 13 shows a case of an antenna port 7 and 8 and FIG. 14 shows a case of an antenna port 9 and 10.

Referring to FIG. 13 and FIG. 14, a DM-RS corresponding to an antenna port {7, 8} is mapped to an identical resource element using a sequence according to an antenna port with a code division multiplexing scheme for a DM-RS group 1 and a DM-RS corresponding to an antenna port {9, 10} is mapped to an identical resource element using the sequence according to the antenna port with a code division multiplexing scheme for a DM-RS group 2.

Figure 15:
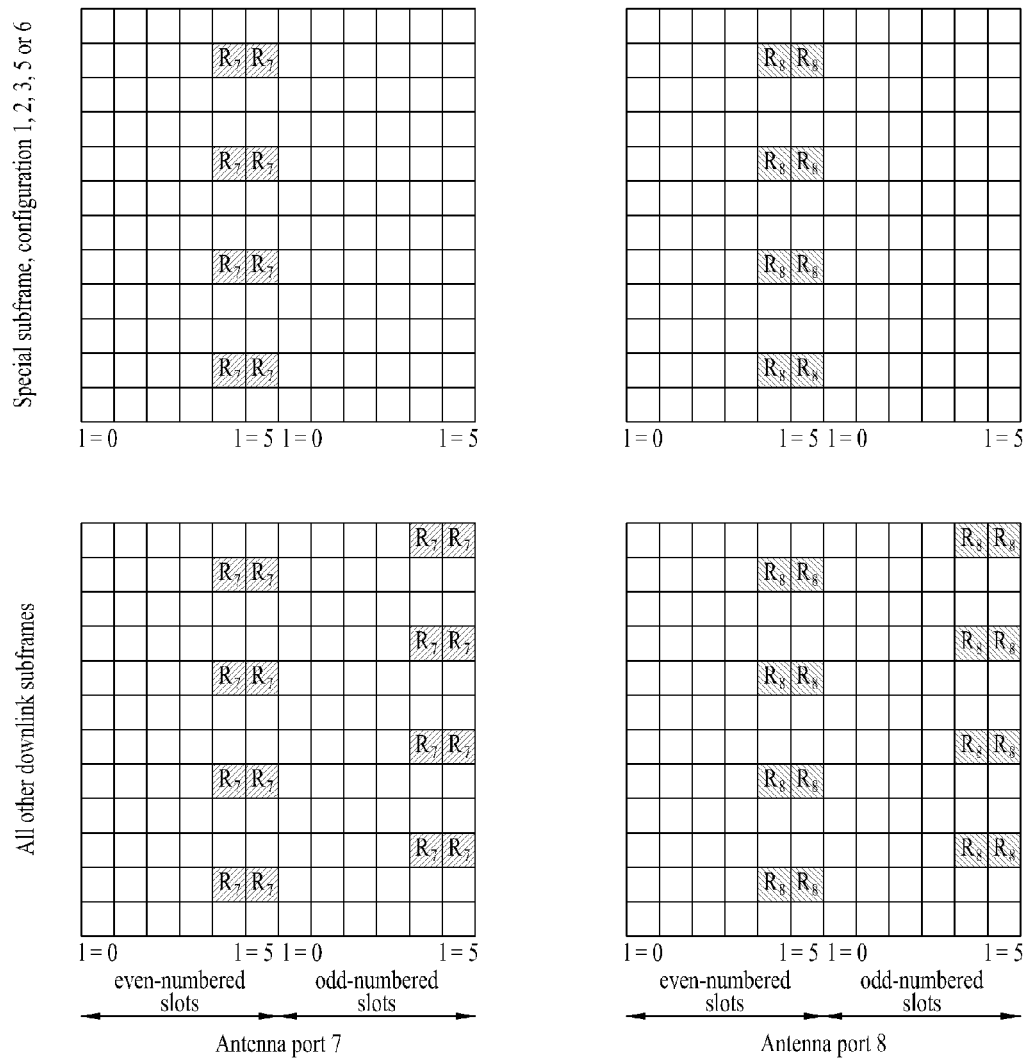
FIG. 15 is a diagram for an example of DM-RS allocation in a subframe to which an extended CP, which is defined by current 3GPP standard documentation, is applied.

FIG. 15 is a diagram for an example of DM-RS allocation in a subframe to which an extended CP, which is defined by current 3GPP standard documentation, is applied.

Referring to FIG. 15, it is able to know that an antenna port 7 and an antenna port 8 are allocated only in a subframe to which an extended CP is applied and two antenna ports are included in an identical DM-RS group. Hence, the antenna ports are mapped to an identical resource element using the code division multiplexing scheme.

The present invention proposes a scheme of determining an antenna port of a DM-RS for E-PDCCH.

When FIG. 13 of a normal CP case and FIG. 14 of an extended CP case are compared with each other, since a great number of resource elements are usable for a downlink transmission in a normal downlink subframe, although a greater number of resources are used as a DM-RS, relatively less overhead of the DM-RS can be maintained. On the contrary, if a small number of resource elements are used for a downlink transmission such as DwPTS of a short length, a smaller number of resources should be used as the DM-RS to maintain a level of the DM-RS overhead similar to the level of the DM-RS overhead of a normal downlink subframe.

As mentioned in the foregoing description, according to a structure of a DM-RS of a current LTE system, an antenna port 7 and an antenna port 8 are transmitted in a manner of being distinguished from each other by a code orthogonal to each other in an identical resource element. An antenna port 9 and an antenna port 10 are transmitted in a manner of being distinguished from each other by a code orthogonal to each other in a resource separated from the resource element. A DM-RS which is transmitted in a manner of being distinguished from each other by a code in an identical resource element can be named a CDM (code division multiplex) group.

Hence, in a resource element in which a DM-RS is transmitted, transmit power of a DM-RS transmitted by the antenna port 7 and transmit power of a DM-RS transmitted by the antenna port 8 are totaled up and transmit power of a DM-RS transmitted by the antenna port 9 and the antenna port 10 are totaled up, respectively. In particular, if there is a limit on transmit power available for an individual resource element, DM-RSs of antenna ports transmitted in an identical resource element are distributed in a manner that transmit power of the DM-RSs are divided. Consequently, transmit power of an individual antenna port is reduced.

On the contrary, if one antenna port is transmitted in one CDM group only, since all transmit power of a corresponding resource element can be used by a DM-RS of the antenna port, it may be easier to boost transmit power of the DM-RS. Yet, in order to do so, since a greater number of resource elements should be used to transmit the DM-RS, DM-RS overhead may increase.

The present invention proposes a scheme of appropriately selecting a set of DM-RSs to be used for transmission in consideration of a relation between a DM-RS transmit power boosting effect and DM-RS overhead. In the following, for clarity, an example of transmitting a DM-RS using two antenna ports among an antenna port 7 to an antenna port 10 is explained. In particular, when a DM-RS is transmitted in a manner of selecting two antenna ports, a transmit diversity scheme can be applied to a signal (i.e., E-PDCCH or PDSCH) in which modulation and demodulation is performed using the DM-RS. An example of the transmit diversity scheme can include SFBC (space frequency block coding), a beam cycling scheme converting a precoder applied to each resource element according to a predefined scheme and the like. In this case, as a specific example of the beam cycling scheme, antenna ports different from each other can be applied according to each resource element. In particular, the transmit diversity scheme is suitable for a transmission of a control signal requiring a more stable transmission.

According to the principle of the present invention, in case that the relatively large number of resource elements are usable for transmitting E-PDCCH, DM-RSs belonging to CDM groups different from each other are used to utilize transmit power boosting. In particular, a DM-RS to be used for channel demodulation is transmitted using an antenna port 7 and an antenna port 9 (or an antenna port 8 and an antenna port 10). More specifically, in order to apply the aforementioned beam cycling scheme, the antenna port 7 and the antenna port 9 belonging to CDM groups different from each other are cyclically applied according to each resource element.

On the contrary, in case of using the relatively small number of resource elements for channel transmission, as mentioned in the foregoing description, a DM-RS is transmitted by selecting a single CDM group to reduce DM-RS overhead. According to the above-mentioned example, the antenna port 7 and the antenna port 8 (or the antenna port 9 and the antenna port 10) can be used to transmit the DM-RS. More specifically, in order to apply the aforementioned beam cycling scheme, the antenna port 7 and the antenna port 8 (or the antenna port 9 and the antenna port 10) belonging to an identical CDM group are cyclically applied according to each resource element.

In order to compare relative size of resource elements with each other, a prescribed threshold value is defined in advance and an appropriate operation can be performed according to whether the number of resource elements available for E-PDCCH transmission or the number of OFDM symbols is greater than the prescribed threshold value.

Or, an appropriate operation can be performed according to a subframe type. For instance, while the antenna port 7 and the antenna port 9 belonging to CDM groups different from each other are used in a normal downlink subframe, the antenna port 7 and the antenna port 8 belonging to an identical CDM group can be used in a special subframe.

Or, an appropriate operation can be performed according to a CP length. For instance, while the antenna port 7 and the antenna port 9 are used for a normal CP in which the relatively large number of resource elements exists, the antenna port 7 and the antenna port 8 can be used for an extended CP in which the less number of resource elements exist.

Or, an eNode B can indicate a set of antenna ports to be used according to each subframe via an upper layer signal and the like in advance.

According to a different embodiment to which the principle of the present invention is applied, while DM-RSs positioned at CDM groups different from each other are always used to apply transmit power boosting, if the number of resource elements available for E-PDCCH transmission is small, remaining DM-RS resource elements can be used as an available resource element for E-PDCCH instead of transmitting the DM-RS in a part of DM-RS resource elements.

For instance, while using the antenna port 7 and the antenna port 9, if the available number of OFDM symbols is decreased to less than a prescribed number, as shown in an example of allocating a DM-RS in FIG. 13 and FIG. 14, instead of always transmitting a DM-RS using all 4 OFDM symbols, the DM-RS can be transmitted using 2 preceding or following OFDM symbols only among the 4 OFDM symbols.

Or, since a DM-RS of a single antenna port is always transmitted in a single CDM group only, it is not necessary to spread a DM-RS signal out for two resource elements adjacent to each other. Hence, if the number of resource elements available for E-PDCCH transmission is small, DM-RS signals corresponding to a first symbol and a third symbol (or a second symbol and a fourth symbol) can be transmitted only.

Figures 16, 17:
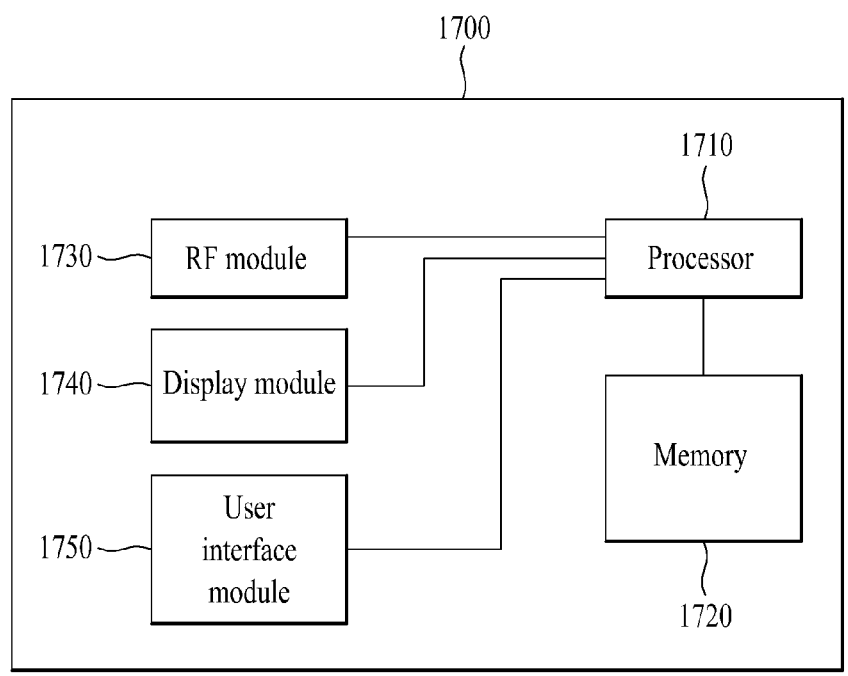
FIG. 16 is a diagram for an example of allocating an antenna port to resource elements for E-PDCCH transmission according to embodiment of the present invention.
FIG. 17 is a block diagram for an example of a communication device according to one embodiment of the present invention.

FIG. 16 is a diagram for an example of allocating an antenna port to resource elements for E-PDCCH transmission according to embodiment of the present invention. In particular, FIG. 16 shows an example that an antenna port is allocated in an available resource element unit constructing E-REG FIG. 16(a) shows E-PDCCH transmission in a subframe of a normal CP and FIG. 16(b) shows E-PDCCH transmission in a subframe of an extended CP. In FIG. 16, a number in a grid indicates a DM-RS antenna port index allocated to a corresponding resource element.

Referring to FIG. 16(a), in case of a normal CP in which the relatively large number of resource elements exists, it is able to know that an antenna port 7 and an antenna port 9 are cyclically allocated to available resource elements constructing E-REG to apply the beam cycling scheme.

On the contrary, referring to FIG. 16(b), in case of an extended CP in which the relatively small number of resource elements exists, it is able to know that an antenna port 7 and an antenna port 8 are cyclically allocated to available resource elements constructing E-REG to apply the beam cycling scheme.

FIG. 17 is a block diagram for an example of a communication device according to one embodiment of the present invention.

Referring to FIG. 17, a communication device 1700 may include a processor 1710, a memory 1720, an RF module 1730, a display module 1740, and a user interface module 1750.

Since the communication device 1700 is depicted for clarity of description, prescribed module(s) may be omitted in part. The communication device 1700 may further include necessary module(s). And, a prescribed module of the communication device 1700 may be divided into subdivided modules. A processor 1710 is configured to perform an operation according to the embodiments of the present invention illustrated with reference to drawings. In particular, the detailed operation of the processor 1710 may refer to the former contents described with reference to FIG. 1 to FIG. 16.

The memory 1720 is connected with the processor 1710 and stores an operating system, applications, program codes, data, and the like. The RF module 1730 is connected with the processor 1710 and then performs a function of converting a baseband signal to a radio signal or a function of converting a radio signal to a baseband signal. To this end, the RF module 1730 performs an analog conversion, amplification, a filtering, and a frequency up conversion, or performs processes inverse to the former processes. The display module 1740 is connected with the processor 1710 and displays various kinds of informations. And, the display module 1740 can be implemented using such a well-known component as an LCD (liquid crystal display), an LED (light emitting diode), an OLED (organic light emitting diode) display and the like, by which the present invention may be non-limited. The user interface module 1750 is connected with the processor 1710 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of allocating a reference signal antenna port for a transmit diversity technique in a wireless communication system and an apparatus therefor are described with reference to examples applied to 3GPP LTE system, it may be applicable to various kinds of wireless communication systems as well as the 3GPP LTE system.

What is claimed is:
1. A method of transmitting a downlink control channel to a user equipment by a base station in a wireless communication system, the method comprising:
configuring resource element subsets comprised of a plurality of resource elements;
allocating transmission resources for the downlink control channel in a unit of the resource element subset;
allocating two antenna ports for a demodulation-reference signal (DM-RS) to the plurality of the resource elements alternatively; and
transmitting the downlink control channel through the transmission resources using the DM-RS of the allocated two antenna ports,
wherein a first index of the allocated two antenna ports is a fixed value,
wherein a second index of the allocated two antenna ports is determined based on which cyclic prefix is applied to a subframe on which the downlink control channel is transmitted among a normal cyclic prefix and an extended cyclic prefix, wherein if the downlink control channel is transmitted on a subframe with the normal cyclic prefix, the allocated two antenna ports are not multiplexed to same resource elements, and wherein if the downlink control channel is transmitted on a subframe with the extended cyclic prefix, the allocated two antenna ports are multiplexed to same resource elements.

2. The method of claim 1, wherein if the downlink control channel is transmitted on a subframe with the normal cyclic prefix, the first and second indexes of the allocated two antenna ports are 7 and 9, respectively.

3. The method of claim 1, wherein if the downlink control channel is transmitted on a subframe with the extended cyclic prefix, the first and second indexes of the allocated two antenna ports are 7 and 8, respectively.

4. A base station in a wireless communication system, comprising:
- a processor configured to configure resource element subsets comprised of a plurality of resource elements, to allocate transmission resources for the downlink control channel in a unit of the resource element subset, and to allocate two antenna ports for a demodulation-reference signal (DM-RS) to the plurality of resource elements alternatively; and
- a wireless communication module configured to transmit the downlink control channel to a user equipment through the transmission resource using the DM-RS of the allocated two antenna ports, wherein a first index of the allocated two antenna ports is a fixed value, wherein a second index of the allocated two antenna ports is determined based on which cyclic prefix is applied to a subframe on which the downlink control channel is transmitted among a normal cyclic prefix and an extended cyclic prefix, wherein if the downlink control channel is transmitted on a subframe with the normal cyclic prefix, the allocated two antenna ports are not multiplexed to same resource elements, and wherein if the downlink control channel is transmitted on a subframe with the extended cyclic prefix, the allocated two antenna ports are multiplexed to same resource elements.

5. The base station of claim 4, wherein if the downlink control channel is transmitted on a subframe with the normal cyclic prefix, the first and second indexes of the allocated two antenna ports are 7 and 9, respectively.

6. The base station of claim 4, wherein if the downlink control channel is transmitted on a subframe with the extended cyclic prefix, the first and second indexes of the allocated two antenna ports are 7 and 8, respectively.

* * * * *